United States Patent
Dai et al.

(10) Patent No.: US 12,090,515 B2
(45) Date of Patent: Sep. 17, 2024

(54) ACOUSTIC WAVE TYPE ELECTRIC CLEANING CARE APPLIANCE AND PRESSURE ALARM DEVICE FOR SAME

(71) Applicant: SHANGHAI SHIFT ELECTRICS CO., LTD., Shanghai (CN)

(72) Inventors: Xiaoguo Dai, Shanghai (CN); Zhenwu Xu, Shanghai (CN)

(73) Assignee: SHANGHAI SHIFT ELECTRICS CO., LTD., Shanghai (CN)

( * ) Notice: Subject to any disclaimer, the term of this patent is extended or adjusted under 35 U.S.C. 154(b) by 465 days.

(21) Appl. No.: 17/614,305

(22) PCT Filed: Apr. 8, 2020

(86) PCT No.: PCT/CN2020/083634
§ 371 (c)(1),
(2) Date: Nov. 24, 2021

(87) PCT Pub. No.: WO2020/238421
PCT Pub. Date: Dec. 3, 2020

(65) Prior Publication Data
US 2022/0258206 A1 Aug. 18, 2022

(30) Foreign Application Priority Data
May 29, 2019 (CN) .......................... 201910457281.6

(51) Int. Cl.
*B06B 1/04* (2006.01)
*A61C 17/20* (2006.01)
*A61C 17/22* (2006.01)
(Continued)

(52) U.S. Cl.
CPC .............. *B06B 1/045* (2013.01); *A61C 17/20* (2013.01); *A61C 17/225* (2013.01); *A61C 17/3481* (2013.01); *H02K 33/18* (2013.01)

(58) Field of Classification Search
CPC ....... B06B 1/045; A61C 17/20; A61C 17/225; A61C 17/3481; A61C 17/221; A61C 17/00
(Continued)

(56) References Cited

U.S. PATENT DOCUMENTS 10,786,338 B2    9/2020  Dai et al.
2016/0331120 A1*  11/2016  Scheele .................. A46B 5/007
(Continued)

FOREIGN PATENT DOCUMENTS

CA    3029078 A    1/2018
CA    3080820 A    5/2019
(Continued)

OTHER PUBLICATIONS

International Patent Application No. PCT/CN2020/083634; Int'l Search Report; dated Jun. 30, 2020; 2 pages.

*Primary Examiner* — Tom Rodgers
(74) *Attorney, Agent, or Firm* — BakerHostetler

(57) ABSTRACT

Disclosed are an acoustic wave type electric cleaning and care tool and a pressure warning device for same. Upper and lower drive shaft bearings are fixed on a drive shaft. The upper bearing is fixed in left and right brackets by a fixed surface and is stationary. The lower bearing is fixed in the brackets by a upper fixed surface and perform a relative movement such that the lower bearing is separated from or contact with the upper fixed surface. The alarm device comprises a lever, a light-emitting element and a photosensitive element. The lever is provided with a shielding surface and/or a light-shielding protrusion. Light energy is changed by the change of gap between the shielding surface and/or the light-shielding protrusion and the photosensitive element. The change in electrical performance parameters of
(Continued)

the photosensitive element is detected to acquire a load pressure on a cleaning element and realize pressure alarm.

11 Claims, 16 Drawing Sheets

(51) Int. Cl.
*A61C 17/34* (2006.01)
*H02K 33/18* (2006.01)

(58) Field of Classification Search
USPC .................................................. 15/22.1, 21.1
See application file for complete search history.

(56) References Cited

U.S. PATENT DOCUMENTS

| | | |
|---|---|---|
| 2019/0239993 A1 | 8/2019 | Dai et al. |
| 2020/0342740 A1 | 10/2020 | Dai et al. |

FOREIGN PATENT DOCUMENTS

| | | |
|---|---|---|
| CA | 3029078 C | 10/2019 |
| CN | 106175957 A | 12/2016 |
| CN | 206044770 U | 3/2017 |
| CN | 106175957 B | 1/2018 |
| CN | 107753134 A | 3/2018 |
| CN | 208611021 U | 3/2019 |
| EP | 3476364 A1 | 5/2019 |
| EP | 3689294 A1 | 8/2020 |
| EP | 3476364 B1 | 3/2021 |
| JP | 2019-522541 A | 8/2019 |
| JP | 6816169 B2 | 1/2021 |
| JP | 2021-503327 A | 2/2021 |
| KR | 10-1931885 B1 | 12/2018 |
| WO | WO 2018/000448 A1 | 1/2018 |
| WO | WO 2019/095365 A1 | 5/2019 |

* cited by examiner

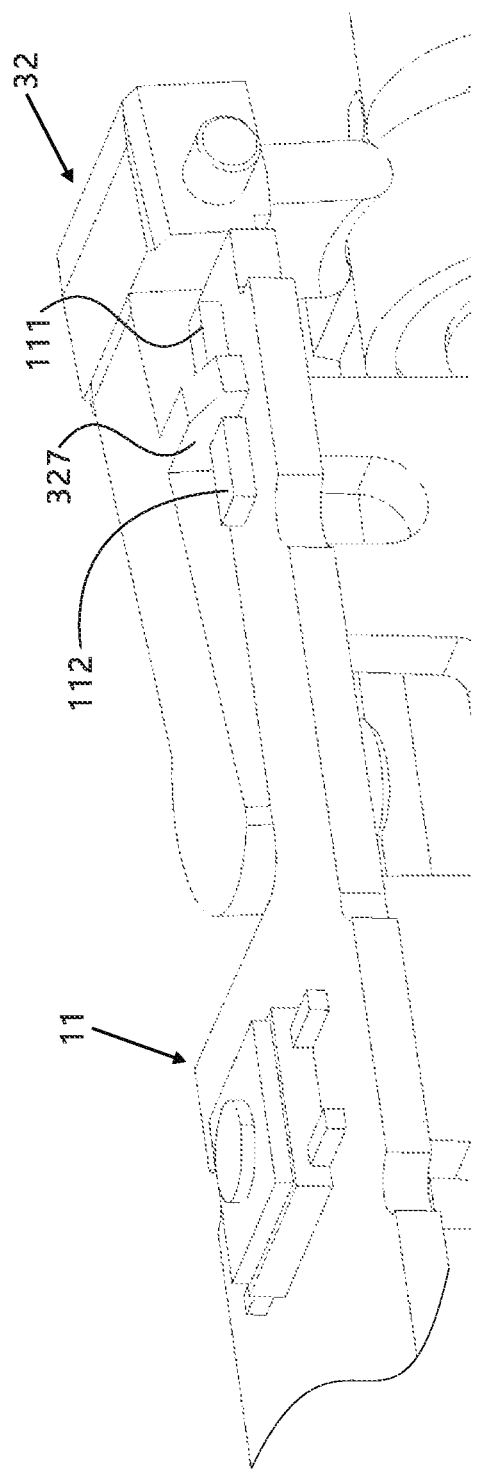

ACOUSTIC WAVE TYPE ELECTRIC CLEANING CARE APPLIANCE AND PRESSURE ALARM DEVICE FOR SAME

CROSS-REFERENCE TO RELATED APPLICATIONS

This application is the National Stage of International Patent Application No. PCT/CN2020/083634, filed on Apr. 8, 2020, which claims priority to Chinese Patent Application No. 201910457281.6, filed on May 29, 2019, the disclosures of which are incorporated herein by reference in their entireties.

TECHNICAL FIELD

The present invention relates to an acoustic wave type electric cleaning care appliance with a pressure alarm device, and also to a pressure alarm device for the acoustic wave type electric cleaning care appliance.

BACKGROUND

Classified by movement mode of a head assembly, existing electric cleaning appliances, such as electric toothbrushes, may usually be divided into three categories, that is, the cleaning element and the cleaning element carrier on the head assembly make reciprocating linear motion (including swinging up and down or swinging left and right); the cleaning element and the cleaning element carrier on the head assembly make reciprocating rotation motion; and the entire head assembly makes reciprocating rotation motion (referred to as acoustic wave type).

In an acoustic wave type electric cleaning care appliance (hereinafter referred to as cleaning care appliance), a resonance oscillation drive system is often used to drive the cleaning element to make rotary motion, so as to operate at a desired high efficiency. As described in the applicant's patent application PCT/CN2015/071696, the cleaning care appliance comprises a handle with a handle housing, inside which are mounted a power supply portion for supplying power to respective portions of the cleaning care appliance, a control portion for controlling various operation modes of the cleaning care appliance and turning on or off the cleaning care appliance, a trigger portion for turning on or off the operation of the cleaning care appliance and a driver for converting input electric energy into mechanical energy output. The driver comprises a transducer, a drive coil, and a drive coil iron core provided in the drive coil. When an alternating current i flows through the drive coil, the permanent magnets distributed on the transducer are subjected to a reaction force of the electromagnetic force to drive the transducer to make a reciprocating rotary motion at the frequency of the alternating current, thereby driving the cleaning element carrier fit on the drive shaft of the transducer as well as the cleaning element distributed on the cleaning element carrier to make reciprocating rotary motion, to achieve the cleaning movement. In the above structure, the transducer, the cleaning element carrier and the cleaning element have natural frequency fn, and the current in the drive coil has its driving frequency $f_0$. The fn is very close to the $f_0$. Generally, if the condition $0.85f_0 < fn < 1.05f_0$ is satisfied, the electromagnetic force between the drive coil and the transducer could keep the transducer, the cleaning element carrier and the cleaning element in a resonance oscillation state, thereby achieving a high mechanical efficiency. Moreover, the transducer comprises at least two transducer elastic members (the left side transducer elastic member and the right side transducer elastic member). The bending strain of the elastic member material is utilized to form a transducer having a natural vibration frequency fn. When the natural frequency fn of the transducer is very close to the drive frequency $f_0$, the electromagnetic force generated by the driving coil in the handle shell and acting on the transducer causes the transducer to be in a resonance oscillation state. When the natural frequency fn of the transducer is equal to the drive frequency $f_0$, the electromagnetic force generated by the drive coil in the handle housing and acting on the transducer causes the transducer to be in a resonant vibration state.

In the applicant's invention patent with the authorization announcement number CN 106618776 B, entitled "Electric Cleaning Care Appliance, Pressure Alarming Method and Apparatus for the Appliance", the pressure alarming device disclosed comprises a detection, collection and alarming circuit and an alarming component, the circuit comprising a power supply, a programmable microchip processor IC and an H-bridge circuit formed of transistors for connecting the power supply and the drive coil. $f_{Omax}$–n is stored in the program of the microchip processor IC. $f_{Omax}$–n corresponding to a selected n value is used as the fixed frequency $f_0$ of the current flowing through the drive coil, wherein –0.3 $(f_{Omax}-f_{Omin}) \le n \le 0.85$ $(f_{Omax}-f_{Omin})$, $f_{Omax}$ is the frequency of the current of the drive coil corresponding to the maximum value of the average voltage on the current-detecting resistor, and $f_{Omin}$ is the frequency of the current of the drive coil corresponding to the minimum value of the average voltage on the current-detecting resistor. The average value $U_{Ls}$ of the power supply voltage and the average voltage $U_{LR25}$ on the current-detecting resistor $R_{25}$ at the alarm load are also pre-stored in the program of the microchip processor IC. The programmable microchip processor IC outputs square waves at a fixed frequency $f_0$ to drive the H-bridge circuit. If $(U_{Ns}/U_{Ls}) \times U_{NR25} > U_{LR25}$, alarm signal is not output or the current pressure alarm signal output is stopped; if $(U_{Ns}/U_{Ls}) \times U_{NR25} \le U_{LR25}$, a pressure alarm signal is output and an alarm is sent. In the patent, by reasonably adjusting the angle between the longitudinal axis of the cleaning element and the normal direction of the plane of the transducer elastic member, the natural frequency $f_n$ of the transducer is increased as the force applied by the load onto the cleaning element increases, and the rate at which the transducer natural frequency $f_n$ changes as the force applied by the load onto the cleaning element increases can be controlled. Once the fixed drive frequency is set, the drive frequency does not change during operation of the cleaning care appliance, so that the vibration amplitude of the cleaning element goes from small to large, and at the same time, the current value of drive coil monotonously decreases from high to low, whereby the personal electric cleaning care appliance has higher mechanical efficiency, smaller working current, less energy consumption, maximum cleaning element amplitude and the best cleaning effect at a reasonable load, and the amplitude can be reduced after the load exceeds a reasonable value to protect the gum. Furthermore, the structure is simple and the cost is low.

In the applicant's another Chinese invention patent application with the publication No. 201711125025.4, entitled "Photosensitive Pressure Alarm Device for Electric Cleaning Care Appliances", the photosensitive pressure alarm device comprises a light sensing part composed of at least one light source and at least one photosensitive unit, a light reflecting surface facing the light source and the photosensitive unit, a detection circuit and an alarm part. The light source and the photosensitive unit are provided on a movable component movable relative to the handle housing or a stationary component which does not move relative to the handle housing and on a same side, and the light reflecting surface is provided on a stationary component or a movable component facing the side on which the light source and the photosensitive unit are provided and roughly directly faces the light source and the photosensitive unit. Under the combined action of an external force $F_1$ which is applied to the cleaning element and of which the direction is approximately along or parallel to an axis along the length direction of the cleaning element and an elastic-member elastic force $F_2$ which resists the external force $F_1$ and is generated by an elastic member built into a handle, the light reflecting surface or the light source and the photosensitive unit provided on the movable component movable relative to the handle housing move with the movable component, and the incident angle and the reflection angle of the light emitted by the light source on the light reflecting surface change, causing that the light receiving area of the photosensitive unit which can receive the light from the light source changes, and in turn resulting in change of the electrical performance of the photosensitive unit.

In the invention patent application with the publication No. CN 104883997 A, there is disclosed an electric toothbrush with a pressure sensor, comprising: a system for determining pressure applied against a user's teeth by bristles of the toothbrush by a direct force measurement; a system for determining pressure applied against the user's teeth by the bristles of the toothbrush by a dynamic force measurement; and a processing system responsive to the pressure determined by the direct force measurement and the dynamic force measurement to adjust the pre-established amount of pressure indicative of excessive bristle force. In the device, the direct force or displacement information is provided by the Hall effect sensor device, and the dynamic load information is also provided by the Hall effect sensor, which is used to measure the phase shift between the phase of the magnetic field response relative to the drive signal.

SUMMARY

The task of the present invention is to provide an acoustic wave type electric cleaning care appliance with a pressure alarm device, which can greatly improve the detection accuracy of the load pressure on the cleaning element without increasing the volume and cost of the cleaning care appliance, thereby improving the sensitivity of the pressure alarm device.

According to the present invention, the provided acoustic wave type electric cleaning care appliance comprises a handle with a handle housing and a handle rear housing. A power supply, a circuit board, a transducer, a drive coil assembly, and a cleaning assembly including a cleaning element carrier and a cleaning element are installed in the handle housing. The transducer includes a drive shaft inserted into the cleaning assembly, left and right transducer brackets, at least two transducer permanent magnets respectively arranged on left and right sides of a longitudinal axis $L_1$ of the drive shaft, respective permanent magnet brackets, left and right side transducer transmission arms fixedly connected to the permanent magnet brackets and the drive shaft, at least two transducer elastic members respectively arranged on the left and right sides of the longitudinal axis $L_1$ of the drive shaft, and at least one fixing member of the transducer elastic member fastened to the left and right transducer brackets. One end of the transducer elastic member is fixedly connected to the fixing member of the transducer elastic member respectively, and the other end of the transducer elastic member is fixedly connected to the corresponding transducer transmission arms respectively. The left and right sides permanent magnets are independent from each other. Polarity of a magnetic pole of one side permanent magnet in a direction toward the drive coil is opposite to the polarity of the magnetic pole of the other side permanent magnet in the direction toward the drive coil. The left and right sides permanent magnets are movable relative to the fixing member of the transducer elastic members. A upper drive shaft bearing and a lower drive shaft bearing are respectively fixed on the drive shaft. The upper drive shaft bearing is fixed in the transducer brackets by a fixed surface of the upper drive shaft bearing located on the left and right transducer brackets and cannot move relative to the fixed surface of the upper drive shaft bearing. The lower drive shaft bearing and a upper fixed surface of the lower drive shaft bearing and a lower fixed surface of the lower drive shaft bearing are associated with each other. The lower drive shaft bearing is fixed in the transducer brackets by the upper fixed surface of the lower drive shaft bearing on the left and right transducer brackets, such that the lower drive shaft bearing can perform relative movement relative to the upper fixed surface of the lower drive shaft bearing or the lower fixed surface of the lower drive shaft bearing to realize separation or contact between the lower drive shaft bearing and the upper fixed surface of the lower drive shaft bearing on the left and right transducer brackets. The cleaning care appliance further includes a photosensitive pressure alarm device, comprising a lever installed on the left and right transducer brackets, a light-emitting element disposed on the circuit board and adjacent to the lever, and a photosensitive element disposed on the circuit board and adjacent to the lever. The lever is provided with a lever shielding surface and/or a light-shielding protrusion in a direction toward the circuit board. Change in the gap between the lever shielding surface and/or the light-shielding protrusion and the photosensitive element causes light energy emitted by the light-emitting element and reaching the photosensitive element through the gap to be changed. Change in corresponding electrical performance parameters of the photosensitive element is detected so as to acquire a load pressure $F_1$ applied on the cleaning element.

In the present invention, the upper fixed surface of the lower drive shaft bearing and the lower fixed surface of the lower drive shaft bearing may restrain the lower drive shaft bearing to only perform limited rotation around a transverse rotation axis $L_4$ of the drive shaft, that is, the lower drive shaft bearing cannot contact the upper fixed surface of the lower drive shaft bearing and the lower fixed surface of the lower drive shaft bearing at the same time. When the lower drive shaft bearing contacts the lower fixed surface of the lower drive shaft bearing, the lower drive shaft bearing and the drive shaft rotate counterclockwise around the transverse rotation axis $L_4$ of the drive shaft to reach a maximum angle. The maximum angle is a limited rotation angle of the drive shaft. The limited rotation angle of the drive shaft may be 0-2 degrees. Preferably, the limited rotation angle is 0-1.5 degrees, and more preferably, the limited rotation angle is 1 degree.

In one embodiment, the left and right sides of the lever are respectively provided with left and right lever rotation shafts. The lever is provided with a protrusion of a short lever arm along a direction away from a lever rotation axis $L_3$ and close to the cleaning assembly, and in an orientation toward the lower drive shaft bearing. The lower drive shaft bearing supports the protrusion of the short lever arm. A protrusion of a long lever arm is provided along a direction away from the lever rotation axis $L_3$ and close to the handle rear housing, and in an orientation toward the lower drive shaft bearing. A spring surrounds the outside of the protrusion of the long lever arm, A bottom plane of the protrusion of the long lever arm supports one end of the spring. A bottom plane of spring bearing holes disposed on the left and right transducer brackets supports the other end of the spring.

Preferably, the left and right lever rotation shafts have a same lever rotation axis $L_3$.

Another task of the present invention to provide a pressure alarm device for the acoustic wave type electric cleaning care appliance. The electric cleaning care appliance comprises a handle with a handle housing and a handle rear housing. A power supply, a circuit board, a transducer, a drive coil assembly, and a cleaning assembly including a cleaning element carrier and a cleaning element are installed in the handle housing. The transducer includes a drive shaft inserted into the cleaning assembly, and left and right transducer brackets. A upper drive shaft bearing and a lower drive shaft bearing are respectively fixed on the drive shaft. The pressure alarm device includes a lever installed on the left and right transducer brackets, a light-emitting element disposed on the circuit board and adjacent to the lever, and a photosensitive element disposed on the circuit board and adjacent to the lever. The lever is provided with a lever shielding surface and/or a light-shielding protrusion in a direction toward the circuit board. The left and right sides of the lever are respectively provided with the left and right lever rotation shafts. The lever is provided with a protrusion of a short lever arm along a direction away from a lever rotation axis $L_3$ and close to the cleaning assembly, and in an orientation toward the lower drive shaft bearing. The lower drive shaft bearing supports the protrusion of the short lever arm. A protrusion of a long lever arm is provided along a direction away from the lever rotation axis $L_3$ and close to the handle rear housing, and in an orientation toward the lower drive shaft bearing. A spring is provided around the outside of the protrusion of the long lever arm. A bottom plane of the protrusion of the long lever arm supports one end of the spring. A bottom plane of spring bearing holes disposed on the left and right transducer brackets supports the other end of the spring. Change in the gap between the lever shielding surface and/or the light-shielding protrusion and the photosensitive element causes light energy emitted by the light-emitting element and reaching a the photosensitive element through the gap to be changed. Change in corresponding electrical performance parameters of the photosensitive element is detected so as to acquire a load pressure $F_1$ applied on the cleaning element and realize the pressure alarm.

Preferably, the long lever arm of the lever has a length of $X_2$, and the short lever arm has a length of $X_1$; the ratio of $X_2$ to $X_1$ is in the range of 1.5-5. More preferably, the ratio of the $X_2$ to the $X_1$ is in the range of 2-4.

The use of the acoustic wave type electric cleaning care appliance with a pressure alarm device and the pressure alarm device for the acoustic wave type cleaning care appliance provided by the present invention can greatly improve the accuracy of detecting the load pressure applied on the cleaning element without increasing the volume and cost of the cleaning care appliance, thereby improving the sensitivity of the pressure alarm device. In addition, in the present invention, the limited rotation angle of the drive shaft is determined by disposing the upper fixed surface of the lower drive shaft bearing and the lower fixed surface of the lower drive shaft bearing such that the elastic member load deformation is effectively controlled, thereby effectively reducing or eliminating the effect of the elastic member load deformation on the service life of the transducer.

BRIEF DESCRIPTION OF THE DRAWINGS

The present invention takes an acoustic wave type electric toothbrush (hereinafter referred to as the electric toothbrush) as an example to explain the cleaning care appliance.

FIG. 16 is a schematic diagram of the combination of the lever and the circuit board when the cleaning element is in a loaded state in the embodiment as shown in FIG. 15.

EXPLANATION OF MAIN REFERENCE NUMERALS

Figure 1:
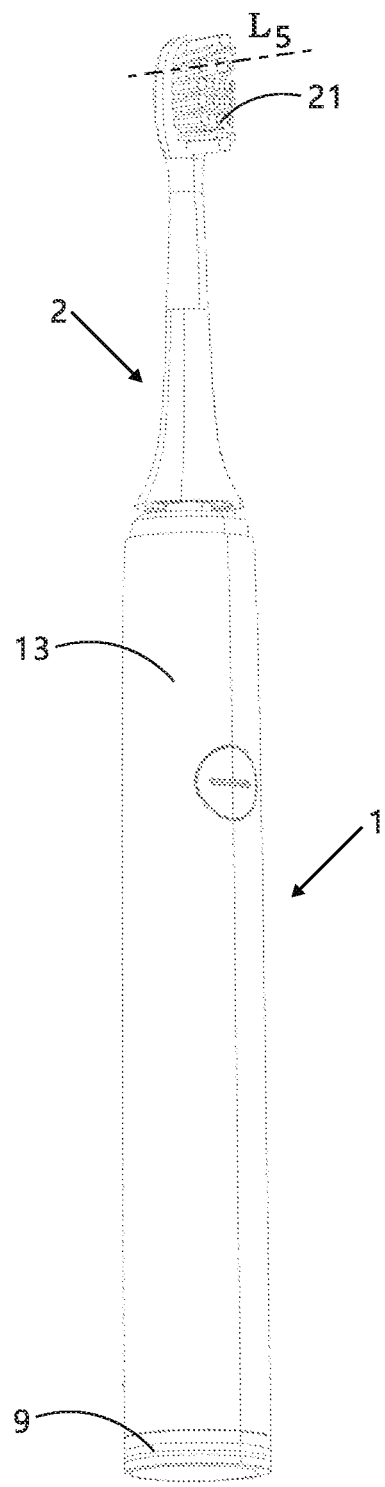
FIG. 1 is a schematic diagram of the electric toothbrush of the present invention.

1 Handle
2 Cleaning assembly
3 Transducer
4 Drive coil assembly
5 Left transducer bracket
6 Left drive coil bracket
7 Right transducer bracket
8 Right drive coil bracket
9 Handle rear housing 10 Battery
11 Circuit board
12 Fixing screw
13 Handle housing
21 Cleaning element
31 Spring
32 Lever
33 Upper chive shaft bearing
34 Lower drive shaft bearing
35 Right transducer permanent magnet
36 Left transducer permanent magnet
37 Drive shaft
38 Transducer elastic member
39 Fixing member of the transducer elastic member
41 Driving coil core
42 Drive coil
71 Lever fixing hole
72 Spring bearing hole
73 Upper fixed surface of the lower drive shaft bearing
74 Protruded through holes
75 Fixed surface of the upper drive shaft bearing
76 Lower fixed surface of the lower chive shaft bearing
77 Bottom plane of the spring bearing holes
111 Photosensitive element
112 Light-emitting element
321 Left lever rotation shaft
322 Right lever rotation shaft
323 Protrusion of the short lever arm
324 Protrusion of the long lever arm
325 Lever shielding surface
326 Bottom plane of the protrusion of the long lever arm
327 Light-shielding protrusion
$X_1$ Length of the short lever arm
$X_2$ Length of the long lever arm
$L_1$ Longitudinal axis of the drive shaft
$L'_1$ longitudinal axis of the upper drive shaft bearing
$L_2$ Transverse axis of the upper drive shaft bearing that passes through the center point of the upper drive shaft bearing, which is perpendicular to the longitudinal axis $L_1$ of the drive shaft and approximately parallel to the longitudinal axis $L_5$ of the cleaning element
$L_3$ Lever rotation axis
$L_4$ Transverse rotation axis of the drive shaft that is perpendicular to the transverse axis $L_2$ of the upper drive shaft bearing and the longitudinal axis of the drive shaft
$L_5$ Longitudinal axis of the cleaning element
F External force acting on the drive shaft
$F_1$ Load pressure applied to the cleaning element
$F_2$ Load force transmitted to the protrusion of the short lever arm
$F_3$ Spring force on the protrusion of the long lever arm
$M_1$ Rotational moment
$M_2$ Moment of the short lever arm
$M_3$ Moment of the long lever arm

DETAILED DESCRIPTION

As mentioned above, exemplary embodiments of the present invention will be described in more detail hereinafter with an acoustic wave type electric toothbrush as a typical example of the acoustic wave type electric cleaning care appliance of the present invention and in conjunction with the accompanying drawings. Although an electric toothbrush is taken as an example for explanation in the following, the present invention is not limited thereto. The present invention may also be applicable to the acoustic wave type electric cleaning care appliances for personal use, such as an acoustic wave type electric shaver, an acoustic wave type electric cleanser, an acoustic wave type electric shower, and the like.

The terms used in this specification are only for the purpose of describing particular exemplary embodiments rather than limiting.

The term "and/or" used in this application comprises any one or all combinations of one or more associated words listed.

The singular forms "a", "an" and "the" used herein may include plural forms unless the context clearly indicates otherwise. The words "comprising", "including" and "having" are broad in scope and specify the presence of specified features, collections, steps, operations, elements and/or components, but do not exclude the presence or addition of one or more other features, collections, steps, operations, elements, components, and/or groups thereof.

Similar reference signs refer to similar parts throughout the drawings.

For the sake of clarity, this description uses terms for expressing relative spatial locations, such as "upper", "lower", "left", "right" and "transverse" to briefly describe the relationships between one element or feature and another element (s) or feature (s) as shown in the figures, wherein "upper" and "lower" are relative to the longitudinal axis of the cleaning element, the end close to the cleaning element being defined as "upper", and the end opposite to "upper" (i.e., the end far from the cleaning element) defined as "lower"; the terms "left" and "right" are relative to the longitudinal axis of the drive shaft, the left side of the longitudinal axis of the drive shaft in the direction perpendicular to the longitudinal axis of the drive shaft when facing corresponding figures being defined as "left", and the right side thereof defined as "right"; the term "transverse" refers to the direction perpendicular to the longitudinal axis of the drive shaft.

Figure 4:
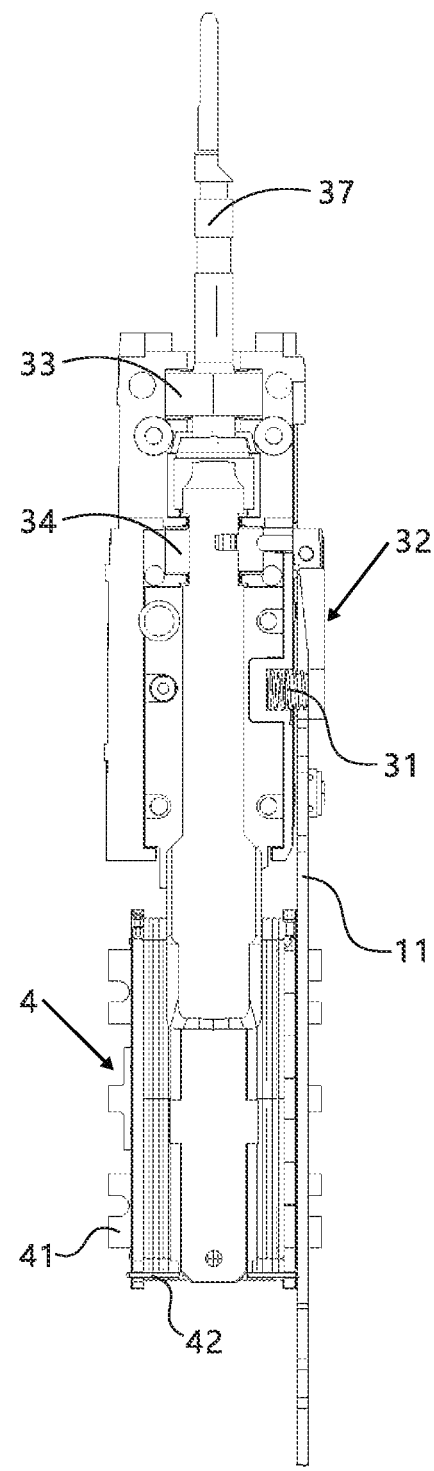
FIG. 4 is a schematic diagram of the combination of the transducer, the drive coil, the circuit board and the lever of the electric toothbrush in an unloaded state (a no-load state) of the cleaning element as shown in FIG. 1.
Figure 5:
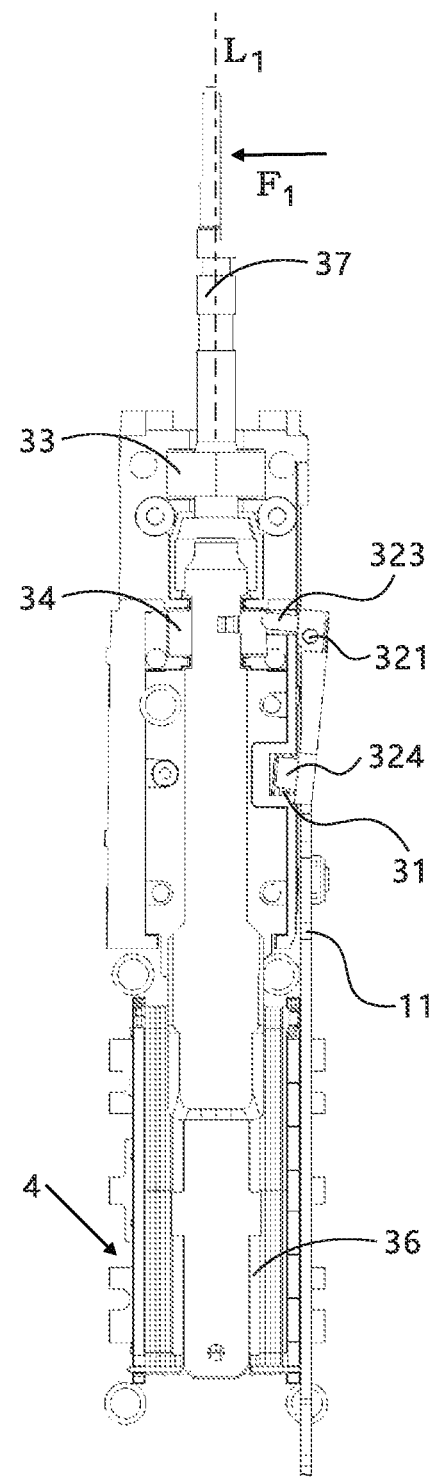
FIG. 5 is a schematic diagram of the combination of the transducer, the drive coil, the circuit board and the lever of the electric toothbrush in a loaded state (a load state) of the cleaning element as shown in FIG. 1.

FIGS. 1-14 show an acoustic wave type electric toothbrush as an example of the electric cleaning care appliance of the present invention. Referring to FIGS. 1-5, the acoustic wave type electric toothbrush of the present invention comprises a handle with a handle housing 13, inside which are equipped with a battery 10 for supplying power to various parts of the toothbrush, a circuit board 11 for controlling the opening or closing of the toothbrush and various operation modes, a transducer 3 for converting input electrical energy into mechanical energy output, a drive coil assembly 4, and a cleaning assembly 2 including a cleaning element carrier and a cleaning element (i.e., bristles) 21 distributed on the cleaning element carrier. The cleaning assembly 2 is detachably connected to the drive shaft 37 (FIGS. 4, 5). The transducer 3 includes a drive shaft 37 inserted into the cleaning assembly; at least one fixing member 39 (FIG. 3) of the transducer elastic member fastened to the left and right transducer brackets 5, 7 (FIG. 2); at least two left and right transducer permanent magnets 36, 35 (FIG. 3) respectively arranged on left and right sides relative to the longitudinal axis $L_1$ of the drive shaft; respective permanent magnet brackets for fixedly connecting the left and right transducer permanent magnets 36, 35; left and right side transducer transmission arms fixedly connected to the permanent magnet brackets and the drive shaft 37; and at least two left and right transducer elastic members 38 (FIG. 3) respectively arranged on the left and right sides of the longitudinal axis $L_1$ of the drive shaft. One end of the left and right side transducer elastic members 38 is fixedly connected to the fixing member 39 of the transducer elastic member respectively, and the other end of the left and right side transducer elastic members 38 is fixedly connected to the respective transducer transmission arms respectively. The left and right side permanent magnets 36, 35 are independent from each other. If the polarity of the magnetic pole of the left side permanent magnets in the direction toward the drive coil is S pole or N pole, the polarity of the magnetic pole of the right side permanent magnets in the direction toward the drive coil is opposite to said polarity of said magnetic pole of said left side permanent magnets. If the polarity of the magnetic pole of the right side permanent magnets n the direction toward the drive coil is S pole or N pole, the polarity of the magnetic pole of the left side permanent magnets in the direction toward the drive coil is opposite to said polarity of said magnetic pole of said right side permanent magnets. The left and right side permanent magnets 36, 35 are movable relative to the fixing member 39 of the transducer elastic member. When an alternating current at a frequency $f_0$ flows through the drive coil 42 (FIG. 4), the left and right transducer permanent magnets 36, 35 rotate reciprocally around the longitudinal axis $L_1$ of the drive shaft, and drive the drive shaft 37 to rotate reciprocally around the longitudinal axis $L_1$ of the drive shaft. The drive shaft 37 drives the cleaning element 21 on the cleaning assembly 2 to rotate reciprocally around the longitudinal axis $L_1$ of the drive shaft.

As shown in FIGS. 6-10 and 14, a upper drive shaft bearing 33 and a lower drive shaft bearing 34 are respectively fixed on the drive shaft 37. The upper drive shaft bearing 33 is fixed in the transducer brackets 5, 7 by the fixed surface 75 of the upper drive shaft bearing located on the left and right transducer brackets 5, 7, and cannot move relative to the fixed surface 75 of the upper drive shaft bearing. The lower drive shaft bearing 34, the upper fixed surface 73 of the lower drive shaft bearing, and the lower fixed surfaces 76 of the lower drive shaft bearing are associated with each other. The lower drive shaft bearing 34 is fixed in the transducer brackets 5, 7 by the upper fixed surface 73 of the lower drive shaft bearing located on the left and right transducer brackets 5, 7, such that the lower drive shaft bearing 34 can perform relative movement relative to the upper fixed surface 73 of the lower drive shaft bearing or the lower fixed surface 76 of the lower drive shaft bearing to realize separation or contact between the lower drive shaft bearing 34 and the upper fixed surface 73 of the lower drive shaft bearing on the left and right transducer brackets 5, 7.

Figure 14:
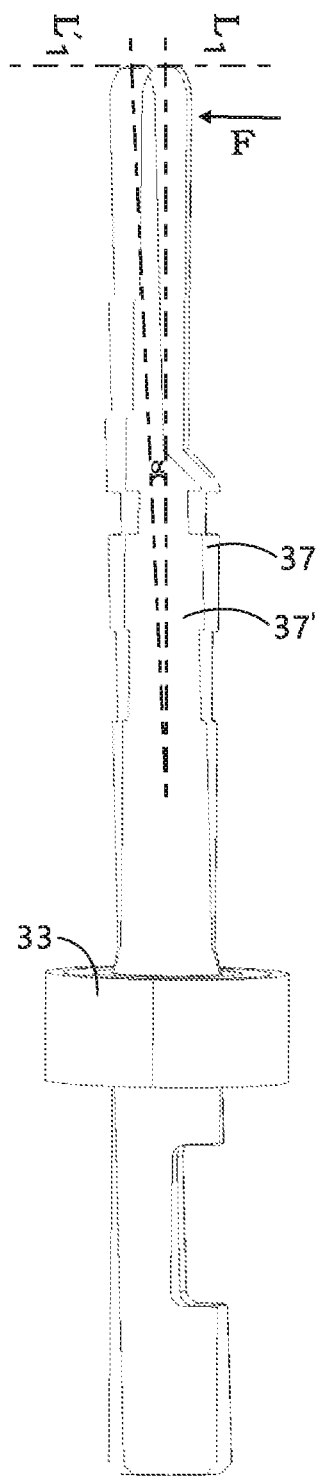
FIG. 14 is a schematic diagram of the combination of the drive shaft and the lower drive shaft bearing when the drive shaft is in an unloaded state and in a loaded state respectively.

A cavity is formed in the upper fixed surface 73 of the lower drive shaft bearing on the left and right transducer brackets 5, 7. The volume of the cavity is larger than the volume of the lower drive shaft bearing, so the lower drive shaft bearing can be accommodated in the cavity. With such a connecting structure, the lower drive shaft bearing 34 can perform limited movement relative to the upper fixed surface 73 of the lower drive shaft bearing or the lower fixed surface 76 of the lower drive shaft bearing. Due to the existence of the internal clearance (play) of the bearing, the drive shaft 37 can be inclined relative to the longitudinal axis of the upper drive shaft bearing 33, as shown in FIG. 14. When there is no external force F and the drive shaft 37 is not inclined relative to the longitudinal axis of the upper drive shaft bearing 33, the longitudinal axis $L_1$ of the drive shaft 37 coincides with the longitudinal axis of the upper drive shaft bearing 33; when the drive shaft 37 is inclined relative to the longitudinal axis of the upper drive shaft bearing 33 under the action of the external force F, the longitudinal axis $L'_1$ of the drive shaft 37 is inclined relative to the longitudinal axis of the upper drive shaft bearing 33, and the included angle between the two axes is $\alpha$ (FIG. 14). The angle $\alpha$ is the inclination angle of the bearing, and the angle $\alpha$ is usually less than 2 degrees.

Figure 7:
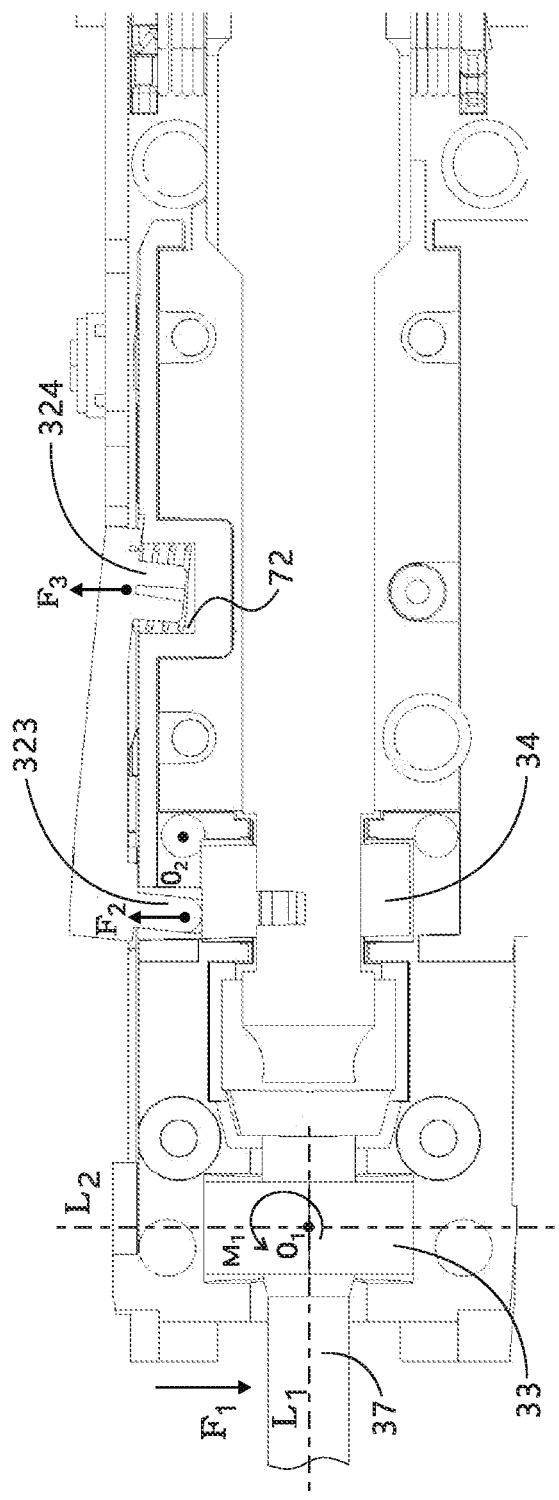
FIG. 7 is a partial enlarged schematic diagram of FIG. 5.

When a load pressure is applied to the cleaning element 21, a pressure $F_1$ is applied on the drive shaft 37 and a rotational moment $M_1$ is generated accordingly (FIG. 7). Because the upper drive shaft bearing 33 is fixed in the left and right transducer brackets 5, 7 and the drive shaft 37 can be inclined relative to the longitudinal axis of the upper drive shaft bearing 33, the rotational moment $M_1$ on the drive shaft 37 is centered at a point $O_1$ (FIG. 7), and the point $O_1$ is the center point of the upper drive shaft bearing 33 located on the longitudinal axis $L_1$ of the drive shaft. The drive shaft 37 rotates counterclockwise around the transverse rotation axis $L_4$ of the drive shaft (not shown in the figure) under the action of the rotational moment $M_1$ with the point $O_1$ as the base point. As shown in FIG. 7, the lower drive shaft bearing 34 fastened on the drive shaft 37 also rotates counterclockwise around the transverse rotation axis $L_4$ of the drive shaft under the action of the rotational moment $M_1$ formed by the load pressure $F_1$ applied on the cleaning element 21, with the point $O_1$ as the base point. In the present invention, the upper fixed surface 73 of the lower drive shaft bearing is arranged on the left and right transducer brackets 5, 7. The lower drive shaft bearing 34 can rotate counterclockwise around the transverse rotation axis $L_4$ of the drive shaft to the limited rotation angle of the drive shaft under the action of the rotational moment $M_1$, with the point $O_1$ as the base point. The applicant has obtained through a lot of experiments that the limited angle is preferably 1.5 degrees, and more preferably 1 degree. In this embodiment, the limited rotation angle of the drive shaft is selected to be 1 degree, while in other embodiments, the limited rotation angle may also be any other angle between 0 degree and 2 degrees.

In the present invention, the lower drive shaft bearing 34 is provided with an upper fixed surface 73 for limiting the rotation angle of the drive shaft. When the lower drive shaft bearing 34 rotates counterclockwise around the drive shaft transverse rotation axis $L_4$ to the limited rotation angle of the drive shaft under the action of the rotational moment $M_1$ with the point $O_1$ as the base point, the upper fixed surface 73 of the lower drive shaft bearing contacts the outer surface of the lower drive shaft bearing 34 and restricts the further rotation of the lower drive shaft bearing 34.

Figure 2:
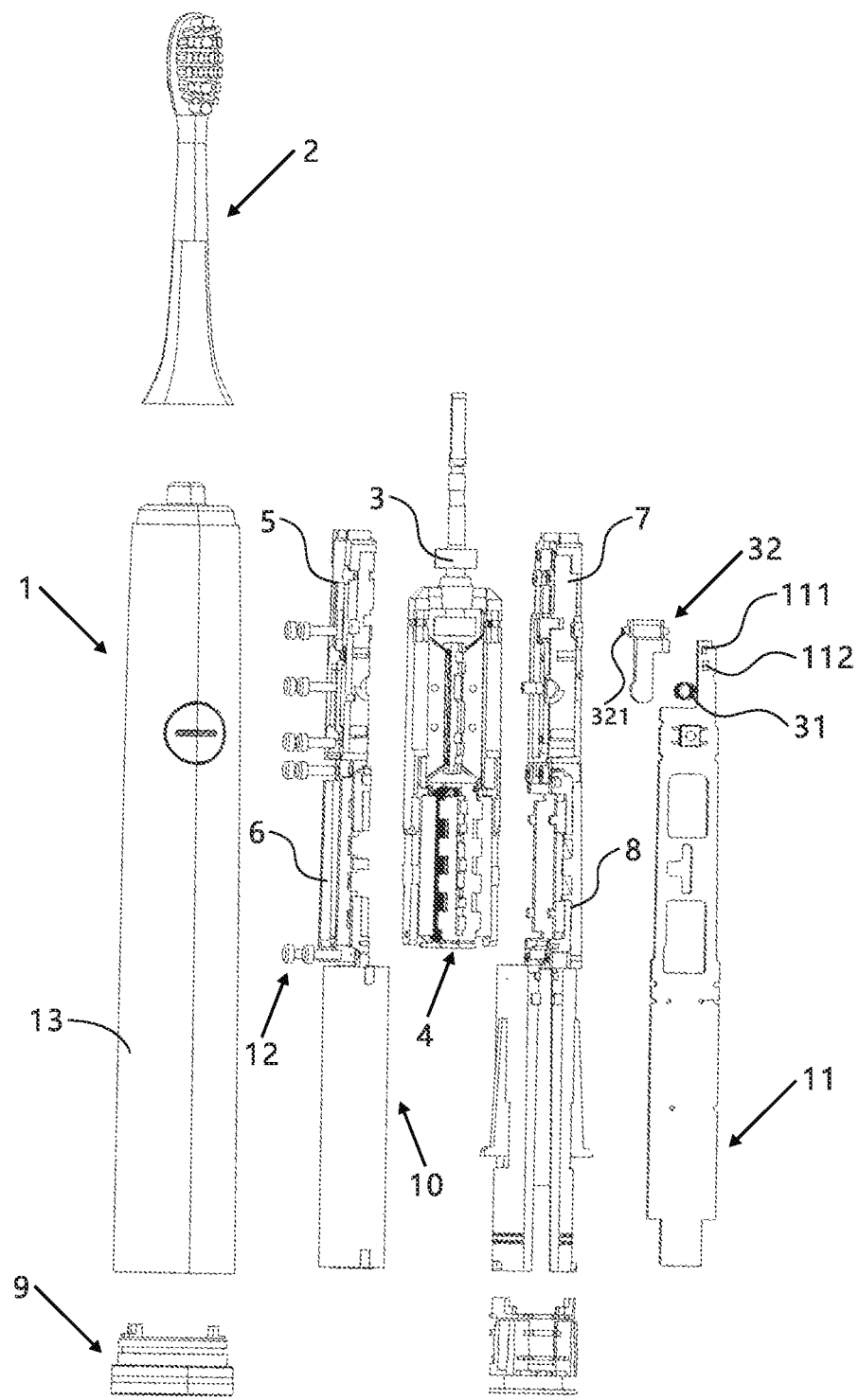
FIG. 2 is a schematic diagram of the assembly of the electric toothbrush as shown in FIG. 1, which shows the assembly relationship between the handle portion and the head assembly.
Figure 3:
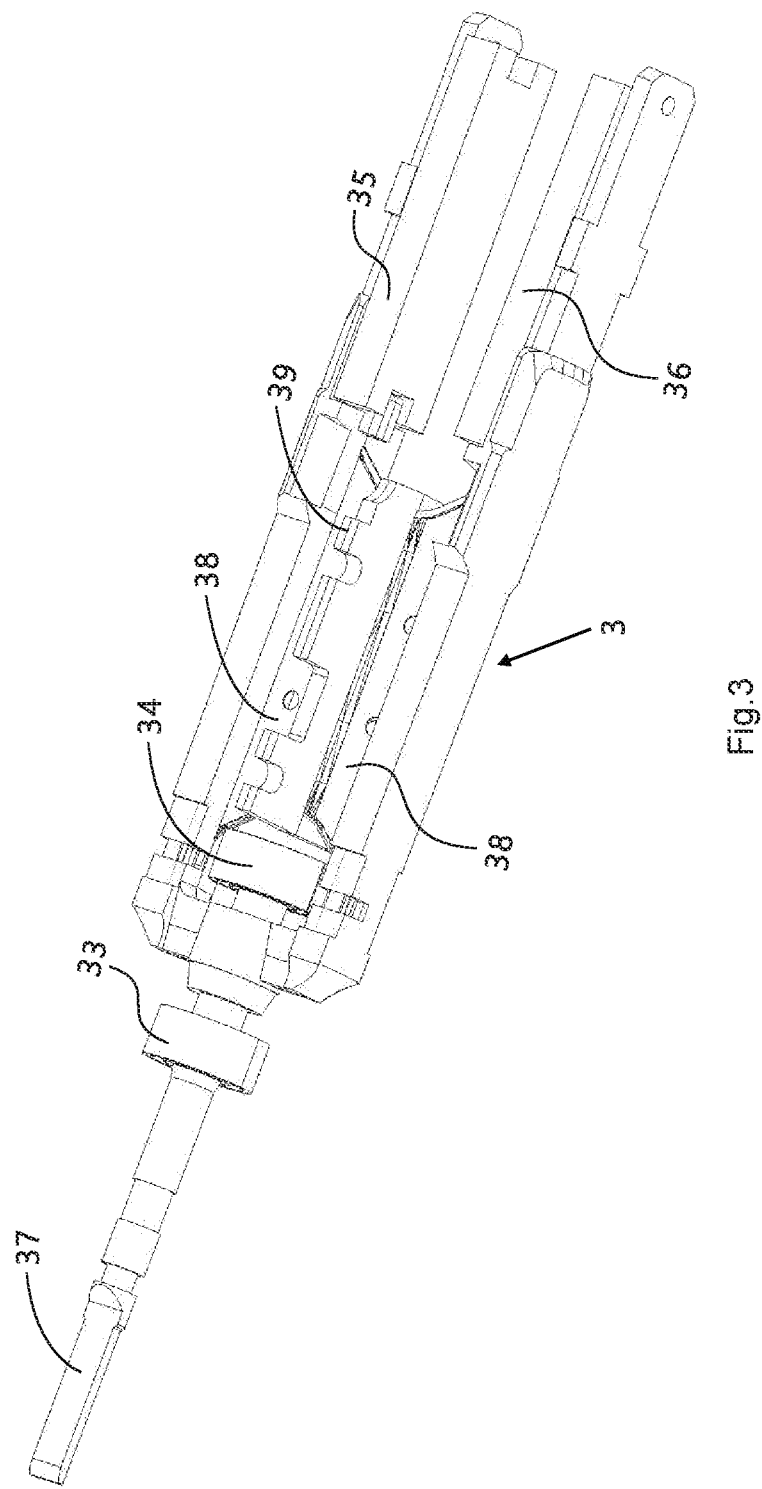
FIG. 3 is a schematic diagram of the transducer of the electric toothbrush in FIG.
Figure 6:
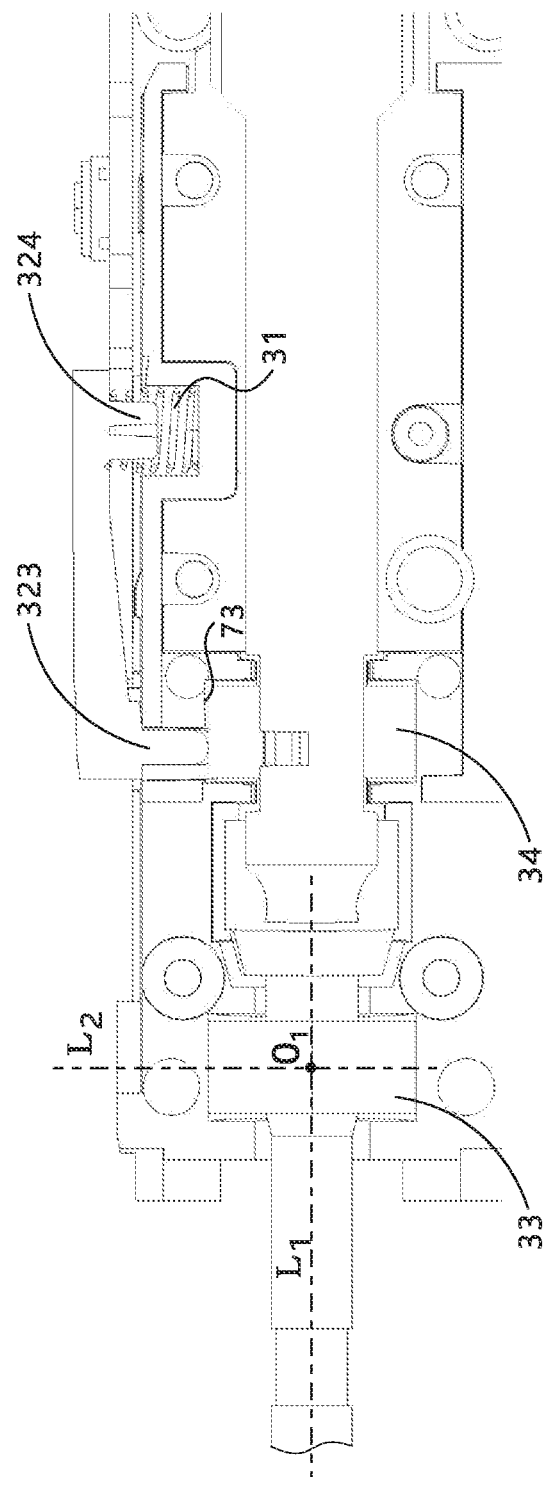
FIG. 6 is a partial enlarged schematic diagram of FIG. 4.
Figure 11:
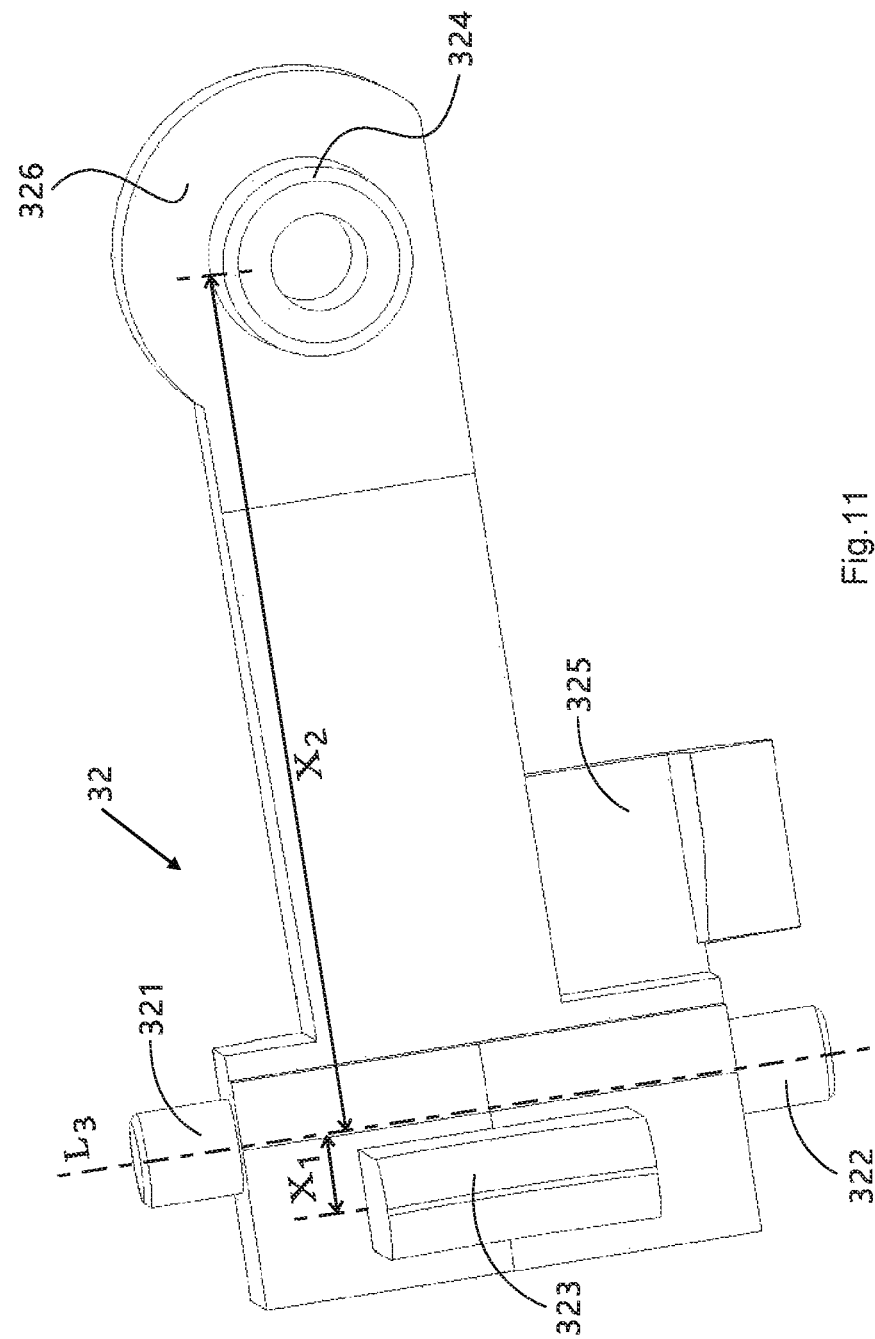
FIG. 11 is a schematic diagram of the lever.

As shown in FIGS. 2, 6, 11, a lever 32 is installed on the left and right transducer brackets 5, 7. The left and right sides of the lever 32 are respectively provided with a left lever rotation shaft 321 and a right lever rotation shaft 322. The left and right lever rotation shafts 321, 322 have the same lever rotation axis $L_3$. The lever 32 is provided with a protrusion 323 of the short lever arm in the direction away from the lever rotation axis $L_3$ and close to the cleaning assembly 2, and in the orientation toward the lower drive shaft bearing 34. The lever 32 is provided with a protrusion 324 of the long lever arm in the direction away from the lever rotation axis $L_3$ and close to the handle rear housing 9, and in the orientation toward the lower drive shaft bearing 34. The length of the arm of force from the force bearing point of the protrusion 323 of the short lever arm to the lever rotation axis $L_3$ is the length $X_1$ of the short lever arm, and the length of the arm of force from the force bearing point of the protrusion 324 of the long lever arm to the lever rotation axis $L_3$ is the length $X_2$ of the long lever arm. A protruded through hole 74 (FIG. 9) is arranged on the right transducer bracket 7 (FIG. 2), and a protruded through hole is also arranged on the left transducer bracket 5 (FIG. 2). The protrusion 323 of the short lever arm passes through the two protruded through holes to contact the lower drive shaft bearing 34, and the lower drive shaft bearing 34 supports the protrusion 323 of the short lever arm. The spring 31 (FIG. 4) surrounds the outside of the protrusion 324 of the long lever arm. The spring 31 can be a cylindrical spring. A bottom plane 326 of the protrusion of the long lever arm supports one end of the spring 31, and a bottom plane 77 (FIG. 9) of spring bearing holes arranged on the left and right transducer brackets 5, 7 supports the other end of the spring 31. As shown in FIGS. 4 and 6, when the cleaning element 21 is in an unloaded state, the spring 31 is in a pre-compressed state, and the pretightening force of the spring 31 pushes the lever 32 to rotate around the lever rotation axis $L_3$, such that the protrusion 323 of the short lever arm is pressed against the upper drive shaft bearing 33.

Figure 8:
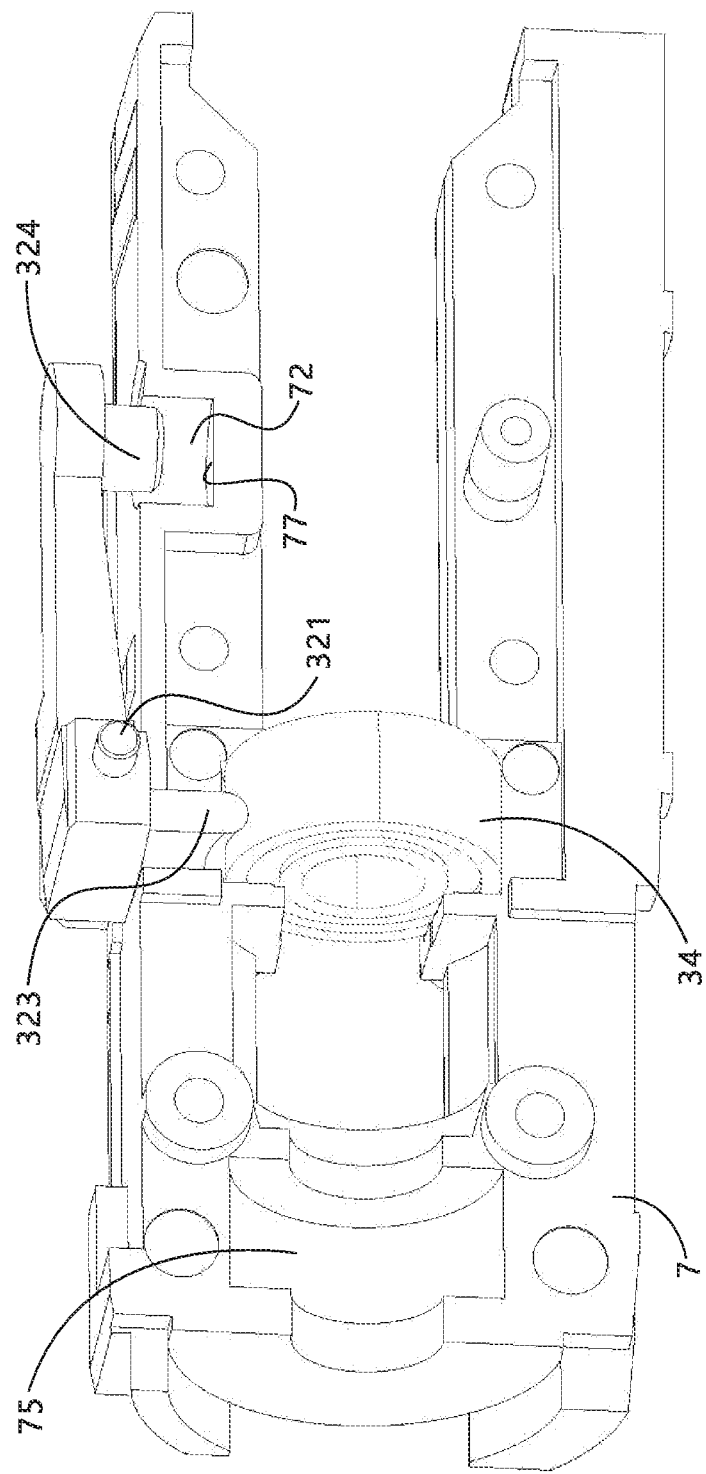
FIG. 8 is a schematic diagram of the combination of the right transducer bracket, the lever and the lower drive shaft bearing.
Figure 9:
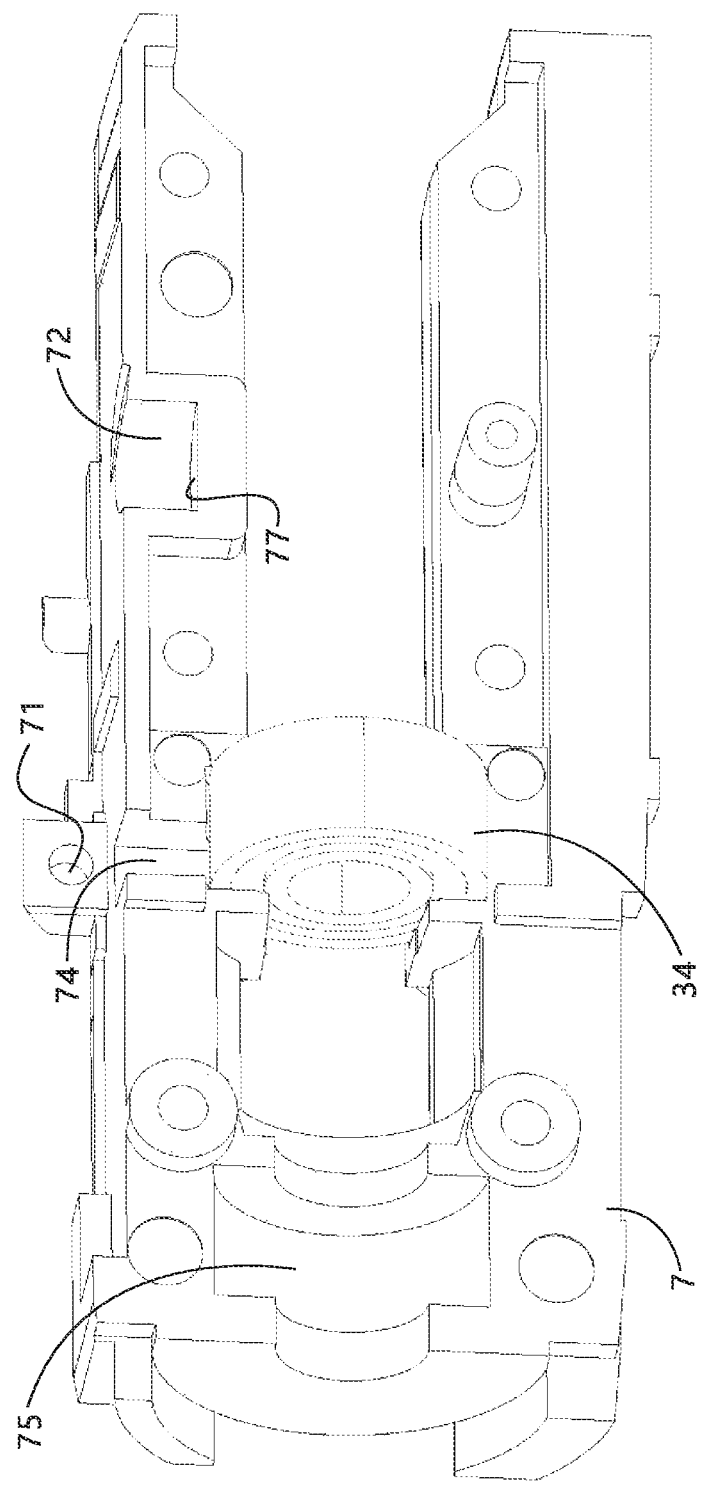
FIG. 9 is a schematic diagram of the combination of the right transducer bracket and the lower drive shaft bearing.
Figure 10:
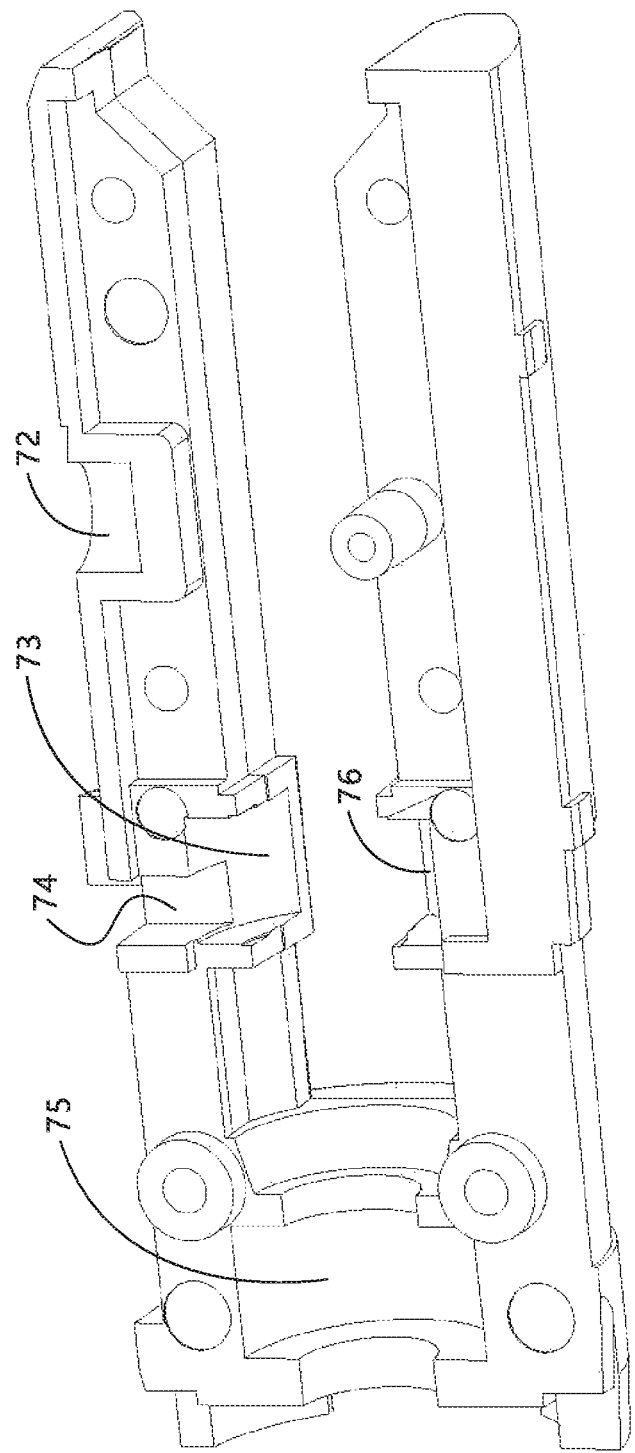
FIG. 10 is a schematic diagram of the right transducer bracket.

As shown in FIGS. 8, 9, 11, the right lever rotation shaft 322 fits with the lever fixing hole 71 disposed on the right transducer bracket 7, and the left lever rotation shaft 321 fits with the lever fixing hole 71 disposed on the left transducer bracket 5. The above two lever fixing holes 71 restrict the lever 32 to only rotate around the lever rotation axis $L_3$.

Figure 12:
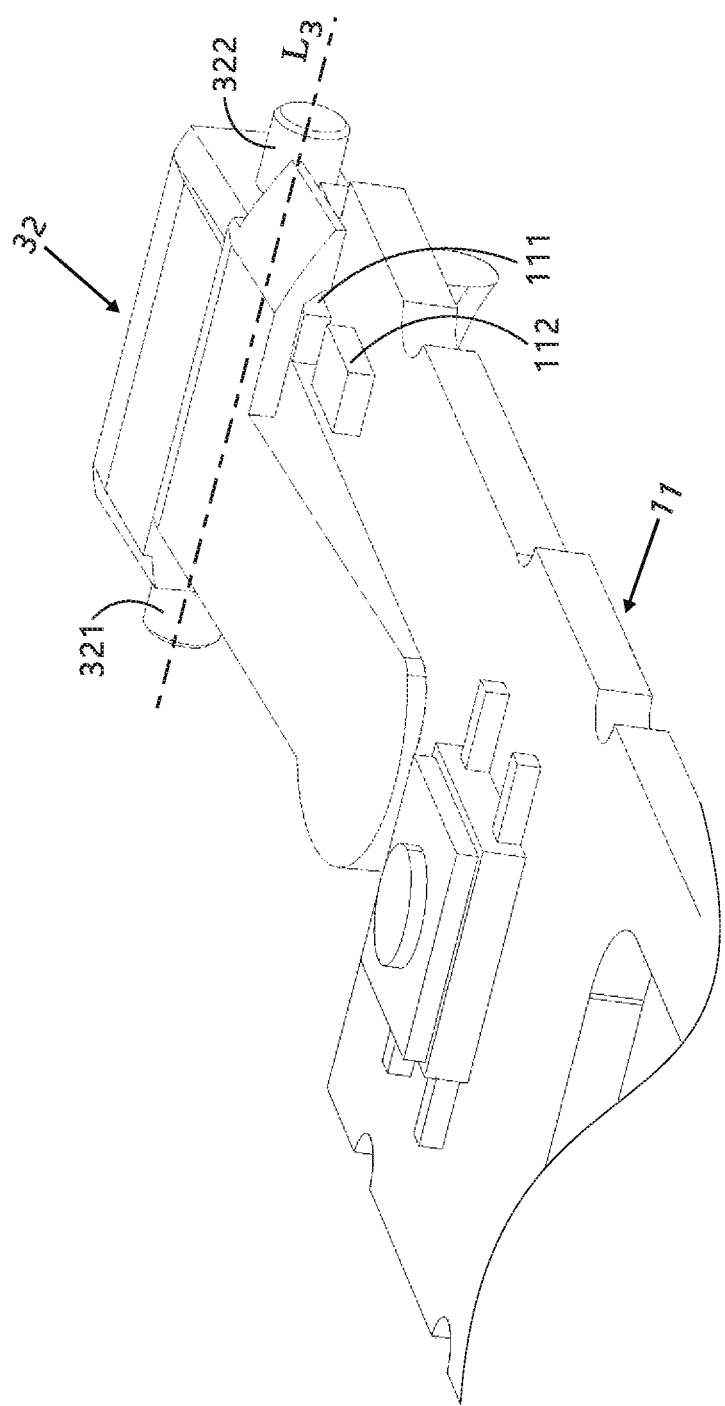
FIG. 12 is a schematic diagram of the combination of the lever and the circuit board when the cleaning element is in a loaded state as shown in FIG. 1.
Figure 13:
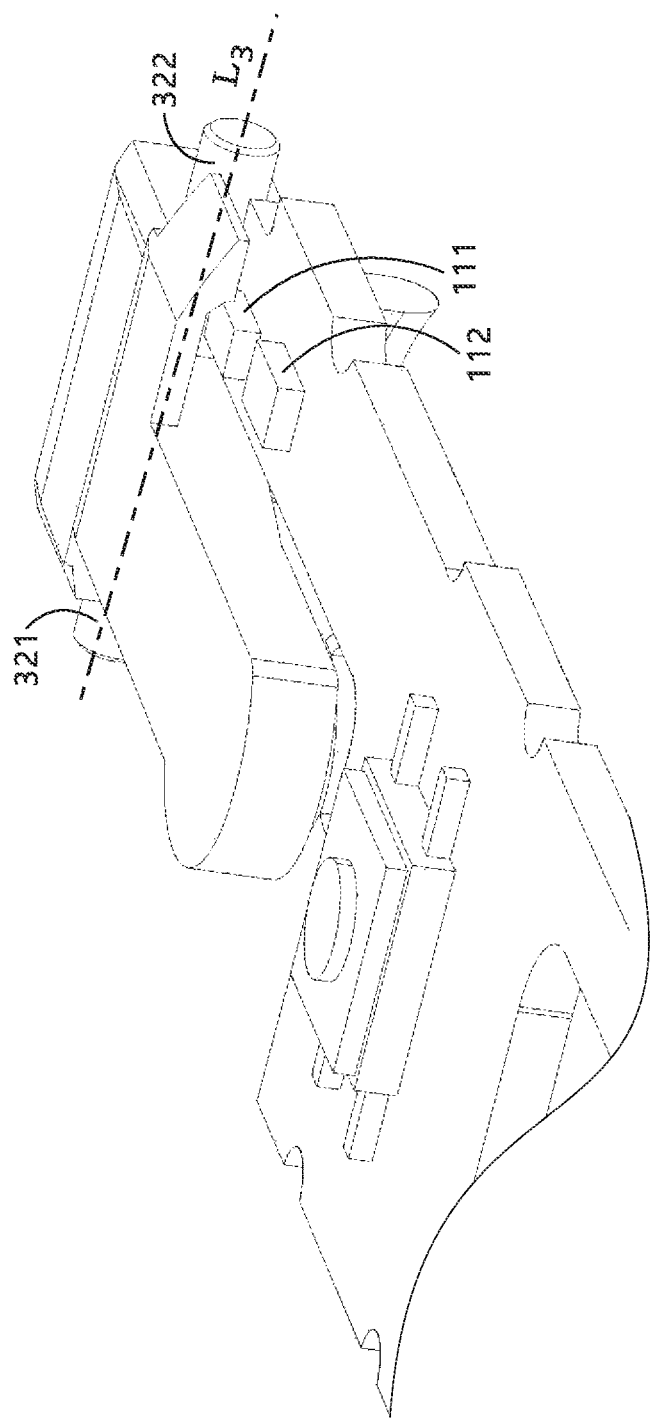
FIG. 13 is a schematic diagram of the combination of the lever and the circuit board when the cleaning element is in an unloaded state as shown in FIG. 1.

As shown in FIGS. 11, 13, the lever 32 is provided with a lever shielding surface 325 in the direction toward the circuit board 11. When the cleaning element 21 is in an unloaded state, the light emitted by the light-emitting element 112 installed on the circuit board 11 and adjacent to the lever 11 can reach the photosensitive element 111 through the gap between the lever shielding surface 325 and the photosensitive element 111 installed on the circuit board 11 and adjacent to the lever 11. As shown in FIG. 12, when the cleaning element 21 is subject to a sufficiently large load, the lever 32 rotates clockwise around the lever rotation axis $L_3$ under the combined action of the load force $F_2$ on the protrusion of the short lever arm and the spring force $F_3$ on the long lever arm. The gap between the lever shielding surface 325 and the photosensitive element 111 gradually decreases, such that the light energy emitted by the light-emitting element 112 and reaching the photosensitive element 111 through the gap between the lever shielding surface 325 and the photosensitive element 111 is reduced.

When the lower drive shaft bearing 34 rotates clockwise around the transverse rotation axis $L_4$ of the drive shaft to the lower fixed surface 76 of the lower drive shaft bearing to contact the lower drive shaft bearing 34 under the action of a moment whose direction is opposite to the direction of the rotational moment $M_1$, or under the action of the spring force $F_3$ formed on the protrusion 324 of the long lever arm, with the point $O_1$ as the base point, the lower drive shaft bearing 34 is restricted from further rotation. At this time, the longitudinal axis $L_1$ of the drive shaft 37 coincides with the longitudinal axis of the upper drive shaft bearing 33. This state is the initial state of the drive shaft 37. When the cleaning element 21 is in an unloaded state, the drive shaft 37 is in the initial state.

In this embodiment, the bending deformation of the left and right side transducer elastic members 38 is used to respond to the movement of the left and right transducer permanent magnets 36, 35, such that the elastic system composed of the transducer 3 and the cleaning assembly 2 generates resonance oscillation under the alternating electromagnetic force from the driving coil 42 to realize the efficient reciprocating rotation of the cleaning element 21. Obviously, due to the internal clearance of the upper drive shaft bearing 33, the drive shaft 37 can be inclined relative to the upper drive shaft bearing 33, and the left and right side transducer transmission arms are inclined relative to the longitudinal axis of the upper drive shaft bearing 33. The left and right side transducer elastic members 38 are inclined relative to the longitudinal axis of the upper drive shaft bearing 33, while the upper drive shaft bearing 33 and the fixing member 39 of the transducer elastic member are stationary with respect to the left and right transducer brackets 5, 7. Therefore, the left and right side transducer elastic members 38 deform with respect to the fixing member 39 of the transducer elastic member, that is, the load pressure $F_1$ applied on the cleaning element 21 will cause the left and right side transducer elastic members 38 to deform. The above deformation is called the elastic member load deformation. The deformation of the left and right side transducer elastic members 38 driven by the left and right transducer permanent magnets 36, 35 is called the elastic member driven deformation. The function of the elastic member driven deformation is to transfer the mechanical energy of the left and right transducer permanent magnets 36, 35 to the cleaning element 21, and the elastic member load deformation does not help the cleaning element 21 to obtain mechanical energy. Excessive elastic member load deformation will also aggravate the fatigue and aging of the transducer elastic member, which causes the transducer elastic member 38 to fatigue and fracture in a short time, and results in the failure of the electric cleaning care appliance. In this embodiment, by configuring the upper fixed surface 73 of the lower drive shaft bearing and the lower fixed surface 76 of the lower drive shaft bearing, the limited rotation angle of the drive shaft is determined, such that the elastic member load deformation is effectively controlled, thereby effectively reducing or eliminating the influence of the elastic member load deformation on the service life of the transducer 3. In addition, in this embodiment, the pressure alarm function is implemented by effective use of the limited rotation of the lower drive shaft bearing 34 around the transverse rotation axis $L_4$ of the drive shaft.

When an user starts the electric toothbrush, an alternating current with a frequency of $f_0$ passes through the drive coil 42. The left and right transducer permanent magnets 36, 35 rotate reciprocally around the longitudinal axis $L_1$ of the drive shaft. The left and right transducer permanent magnets 36, 35 drive the drive shaft 37 to rotate reciprocally around the longitudinal axis $L_1$ of the drive shaft. The drive shaft 37 drives the cleaning element 21 on the cleaning assembly 2 to rotate reciprocally around the longitudinal axis $L_1$ of the drive shaft. When the cleaning element 21 is in an unloaded state, as shown in FIG. 6, the load force transmitted to the drive shaft 37 is zero. The longitudinal axis $L_1$ of the drive shaft coincides with the longitudinal axis of the upper drive shaft bearing 33. The drive shaft 37 is in the initial state. The spring 31 is in a pre-compressed state. The pretightening force of the spring 31 pushes the lever 32 to rotate around the lever rotation axis $L_3$, such that the protrusion 323 of the short lever arm is pressed against the upper drive shaft bearing 33, the upper drive shaft bearing 33 is subject to force of the spring 31 to cling to the lower fixed surface 76 of the lower drive shaft bearing. The gap between the lever shielding surface 325 on the lever 32 and the photosensitive element 111 reaches the maximum. The light energy received by the photosensitive element 111 from the light-emitting element 112 reaches the maximum, and the corresponding electrical parameters, such as resistance value, of the photosensitive element 111 reaches the minimum value. When the user applies a load pressure $F_1$ on the cleaning element 21, as shown in FIG. 7, the load pressure $F_1$ applied on the cleaning element 21 is transmitted to the drive shaft 37, and then to the upper drive shaft bearing 33. The upper drive shaft bearing 33 will transmit this force to the protrusion 323 of the short lever arm to form a load force $F_2$ on the protrusion of the short lever arm. As shown in FIGS. 7 and 11, the product of the load force $F_2$ undergone on the protrusion 323 of the short lever arm and the length $X_1$ of the short lever arm is the moment $M_2$ of the short lever arm (not shown in the figure). The product of the spring force $F_3$ on the long lever arm and the length $X_2$ of the long lever arm is the moment $M_3$ of the long lever arm (not shown in the figure). When the load pressure $F_1$ applied on the cleaning element 21 becomes larger and the moment $M_2$ of the short lever arm is greater than the moment $M_3$ of the long lever arm, the lever 32 rotates clockwise around the lever rotation axis $L_3$, and the bottom plane 326 of the protrusion of the long lever arm pushes the spring 31 to further compress. The longitudinal axis $L_1$ of the drive shaft is inclined relative to the longitudinal axis of the upper drive shaft bearing 33. The load pressure $F_1$ applied on the cleaning element 21 pushes the lower drive shaft bearing 34 away from the lower fixed surface 76 of the lower drive shaft bearing, such that the lower drive shaft bearing 34 moves toward the upper fixed surface 73 of the lower drive shaft bearing. As shown in FIGS. 12 and 11, the gap between the lever shielding surface 325 on the lever 32 and the photosensitive element 111 becomes smaller. The light energy received by the photosensitive element 111 from the light-emitting element 112 becomes smaller. The corresponding electrical parameters (e.g., resistance value) of the photosensitive element 111 becomes larger. When the load pressure $F_1$ applied to the cleaning element 21 becomes further increased, the lower drive shaft bearing 34 contacts the upper fixed surface 73 of the lower drive shaft bearing, and the upper fixed surface 73 of the lower drive shaft bearing restricts the lower drive shaft bearing 34 from further rotating. The load force $F_2$ on the protrusion of the short lever arm reaches the maximum value, and the moment $M_2$ of the short lever arm reaches the maximum value. The gap between the lever shielding surface 325 on the lever 32 and the photosensitive element 111 reaches the minimum value. The light energy received by the photosensitive element 111 from the light-emitting element 112 reaches the minimum value. The corresponding electrical parameters (e.g., resistance value) of the photosensitive element 111 reach the maximum value.

The load pressure $F_1$ applied on the cleaning element 21 causes the transducer elastic member 38 to form the elastic member load deformation. The greater the load pressure $F_1$, the greater the elastic member load deformation. Excessive elastic member load deformation will aggravate the fatigue and aging of the transducer elastic member 38, which causes the transducer elastic member 38 to fatigue and fracture in a short time, and thereby results in the failure of the electric cleaning care appliance. At the same time, applying excessive load pressure $F_1$ on the cleaning element 21 will also cause damage to the gums during the process of cleaning the teeth. In this embodiment, as described above, the drive shaft 37 is fastened with the upper drive shaft bearing 33 and the lower drive shaft bearing 34, The upper drive shaft bearing 33 is fixed in the left and right transducer brackets 5, 7, such that the upper drive shaft bearing 33 cannot move relative to the left transducer bracket 5 and the right transducer bracket 7. Although the lower drive shaft bearing 34 is also fixed in the left and right transducer brackets 5, 7, the lower drive shaft bearing 34 can move limitedly with respect to the left and right transducer brackets 5, 7. Since the lower drive shaft bearing 34 cannot contact the upper fixed surface 73 of the lower drive shaft bearing and the lower fixed surface 76 of the lower drive shaft bearing at the same time, the upper fixed surface 73 of the lower drive shaft bearing and the lower fixed surface 76 of the lower drive shaft bearing can restrain the lower drive shaft bearing 34 to only perform limited rotation around the transverse rotation axis $L_4$ of the drive shaft. When the lower drive shaft bearing 34 contacts the upper fixed surface 73 of the lower drive shaft bearing, the maximum angle of counterclockwise rotation of the lower drive shaft bearing 34 and the drive shaft 37 around the transverse rotation axis $L_4$ of the drive shaft is formed. The maximum angle is the limited rotation angle of the drive shaft. As described above, in the present invention, the maximum value of the limited rotation angle of the drive shaft is 2 degrees, preferably 1.5 degrees, and more preferably 1 degree.

The lower drive shaft bearing 34 supports the protrusion 323 of the short lever arm. The bottom plane 326 of the protrusion of the long lever arm undergoes the pressure of the spring 31. The left lever rotation shaft 321 and the right lever rotation shaft 322 fit with the lever fixing holes 71 arranged on the left and right transducer brackets 5, 7 to make the lever 32 rotate around the lever rotation axis $L_3$ only. The load pressure $F_1$ applied on the cleaning element 21 causes the lower drive shaft bearing 34 to rotate counterclockwise around the transverse rotation axis $L_4$ of the drive shaft. The lower drive shaft bearing 34 pushes the protrusion 323 of the short lever arm, which causes the lever 32 to rotate clockwise around the lever rotation axis $L_3$. The gap between the lever shielding surface 325 on the lever 32 and the photosensitive element 111 changes from large to small. The corresponding electrical parameters (e.g., resistance value) of the photosensitive element 111 change from small to large. The micro-control unit MCU on the circuit board 11 can correspondingly detect the magnitude of the load pressure $F_1$ on the cleaning element 21 by detecting changes in the corresponding electrical parameters (e.g., resistance value) of the photosensitive element Ill. When the load pressure $F_1$ applied on the cleaning element 21 reaches or exceeds the set threshold, the handle 1 can remind the user, in the manner of sound, light, vibration, etc., that the load pressure $F_1$ on the cleaning element 21 is too large, or directly reduce the speed of the electric toothbrush or stop the electric toothbrush, so as to effectively protect the user's gums. In the above-mentioned embodiment, by the ratio of the length $X_2$ of the long lever arm of the lever 32 to the length $X_1$ of the short lever arm can enlarge the corresponding relationship between the load pressure $F_1$ applied on the cleaning element 21 and the displacement of the lower drive shaft bearing 34, so that the gap between the lever shielding surface 325 on the lever 32 and the photosensitive element 111 has a greater change, and the corresponding electrical parameters (e.g., resistance value) of the photosensitive element 111 have a larger change value, thereby greatly increasing the detection accuracy for the load pressure $F_1$ on the cleaning element 21. In this embodiment, the ratio of the length $X_2$ of the long lever arm to the length $X_1$ of the short lever arm is in the range of 1.5-5, preferably 2-4.

Figure 15:
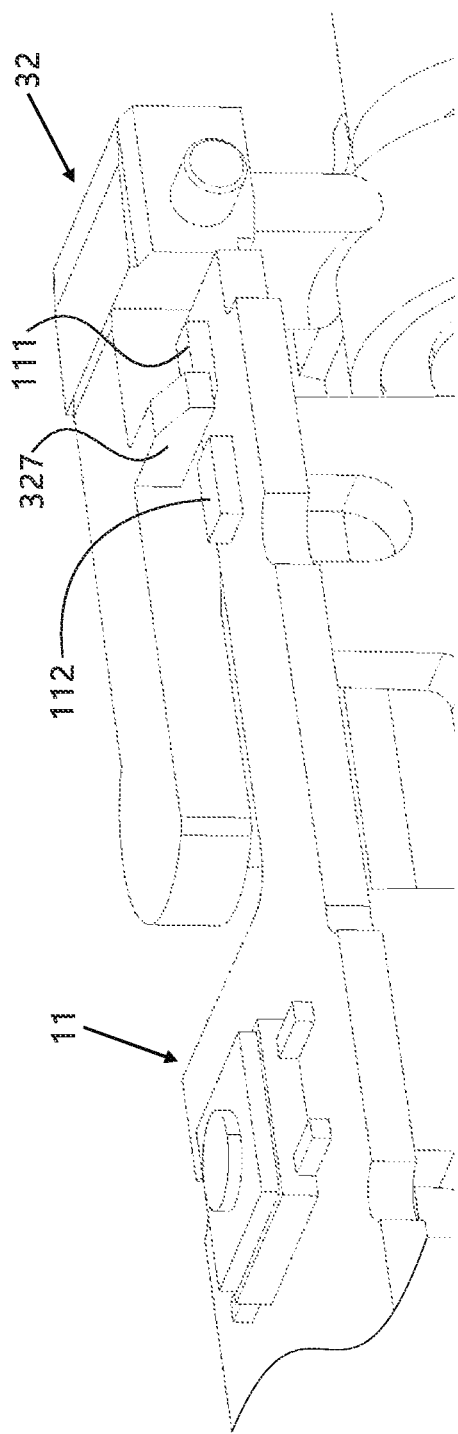
FIG. 15 is a schematic diagram of the combination of the lever and the circuit board when the cleaning element is in an unloaded state in another embodiment of the present invention.

Obviously, the geometric relationship between the photosensitive element 111 and the light-emitting element 112 and the lever 32 is not limited to the foregoing embodiment. In another embodiment, as shown in FIGS. 15 and 16, on the lever 32 is provided a light shielding protrusion 327, the light shielding protrusion 327 extends from the lever 32 to the circuit board 11 and is interposed between the photosensitive element 111 and the light-emitting elements 112. The light shielding protrusion 327 can block the photosensitive element 111 from obtaining light from the light-emitting element 112. The specific analysis is the same as that of the previous embodiment, and will not be repeated here. Obviously, in the above two embodiments, the positions of the photosensitive element 111 and the light-emitting element 112 of the circuit board 11 can be interchanged, which can also achieve the objective of the present invention and achieve the same technical effect.

In the present invention, on the lever 32 is provided the light shielding surface 325 and/or the light shielding protrusion 327, and on the circuit board is provided the light-emitting element 112 and the photosensitive element 111. Under the action of the load pressure $F_1$ applied on the cleaning element 21, the lower drive shaft bearing 34 on the drive shaft 37 rotates around the lever rotation axis $L_3$, and drives the protrusion 323 of the short lever arm to make the lever 32 rotate around the lever rotation axis $L_3$. The rotation of the lever 32 causes a change in the distance from the light shielding surface 325 and/or the light shielding protrusion 327 to the photosensitive element 111 and/or the light-emitting element 112. The light shielding surface 325 and/or the light shielding protrusion 327 can block the photosensitive element 111 from obtaining light energy from the light-emitting element 112. The rotation of the lever 32 causes changes in the electrical parameters (e.g., resistance value) of the photosensitive element 111. The MCU on the circuit board 11 detects the changes in the electrical parameters (e.g., resistance value) of the photosensitive element 111, such that the MCU on the circuit board 11 detects the load pressure $F_1$ applied to the cleaning element 21. When the load pressure $F_1$ applied to the cleaning element 21 is equal to or exceeds the set threshold, the handle 1 is used to alarm the excessive pressure in the manner of sound, light, vibration, shutdown, etc.

It is worth emphasizing that although the present invention and the applicant's another Chinese invention patent application (application publication number 201711125025.4) both use the principle of photosensitive pressure alarm, the present invention is dedicated to the pressure alarm device of acoustic wave type electric cleaning care appliances. In the present invention, with the internal clearance of the upper drive shaft bearing, the drive shaft can be inclined relative to the upper drive shaft bearing. The left and right side transducer transmission arms are inclined relative to the longitudinal axis of the upper drive shaft bearing. The left and right side transducer elastic members are inclined relative to the longitudinal axis of the upper drive shaft bearing. The upper drive shaft bearing and the fixing member of the transducer elastic members are stationary relative to the left and right transducer brackets, so the left and right side transducer elastic members deform relative to the fixing member of the transducer elastic members, that is, the load pressure $F_1$ applied on the cleaning element will cause the left and right side transducer elastic members to undergo elastic member load deformation. The deformation of the left and right side transducer elastic members driven by the left and right transducer permanent magnets is called the elastic member driven deformation. By configuring the upper fixed surface of the lower drive shaft bearing and the lower fixed surface of the lower drive shaft bearing, the limited rotation angle of the drive shaft is determined, such that the elastic member load deformation is effectively controlled, thereby effectively reducing or eliminating the influence of the elastic member load deformation on the service life of the transducer. Meanwhile, the pressure alarm function is implemented by effective use of the limited rotation of the lower drive shaft bearing around the transverse rotation axis $L_4$ of the drive shaft. Moreover, in the present invention, a lever structure is provided, the lever is connected to the transducer, and the lever and the drive coil assembly are in a non-contact relationship, which not only effectively utilizes the limited rotation of the lower drive shaft bearing around the transverse rotation axis $L_4$ of the drive shaft to implement the pressure alarm function, but also adopts the lever amplifying displacement structure, which greatly improves the detection accuracy for the load pressure $F_1$ on the cleaning element, thereby increasing the sensitivity of the pressure alarm device.

In the invention patent application with publication number 201711125025.4, the light source and the photosensitive unit are respectively provided on a movable component movable relative to the handle housing or a stationary component which does not move relative to the handle housing and on a same side, and the light reflecting surface is provided on a stationary component or a movable component facing the side on which the light source and the photosensitive unit are provided and roughly directly faces the light source and the photosensitive unit. Under the combined action of an external force $F_1$ which is applied to the cleaning element and of which the direction is approximately along or parallel to an axis along the length direction of the cleaning element and an elastic-member elastic force $F_2$ which resists the external force $F_1$ and is generated by an elastic member built into a handle, the light reflecting surface or the light source and the photosensitive unit provided on the movable component movable relative to the handle housing move with the movable component, and the incident angle and the reflection angle of the light emitted by the light source on the light reflecting surface change, causing that the light receiving area of the photosensitive unit which can receive the light from the light source changes, and in turn resulting in change of the electrical performance of the photosensitive unit. Comparing the two patent applications, it can be known that they have different structures and different technical solutions. Although FIGS. 13-15 of the application 201711125025.4 show the case where the technical solutions disclosed by this application are used for the acoustic wave type electric cleaning care appliances, the technical solutions of this application are more suitable for the type of the electric cleaning care appliances in which driving components include the micromotor, and the cleaning element and the cleaning element carrier perform reciprocating linear motion or reciprocating rotation motion, because the DC micro-motor can produce large displacement in response to the load force on the cleaning element, and the overall movement of the DC micro-motor does not affect the power output of the motor. For the acoustic wave type electric cleaning care appliances, the transducer cannot produce a large displacement under the action of the load force on the cleaning element, otherwise the service life of the transducer will be greatly shortened.

What is claimed is:

1. An acoustic wave type electric cleaning care appliance, comprising a handle with a handle housing (13) and a handle rear housing (9); a power supply (10), a circuit board (11), a transducer (3), a drive coil assembly (4) comprising at least one drive coil, and a cleaning assembly (2) including a cleaning element carrier and a cleaning element (21) are installed in the handle housing (13); the transducer (3) including a drive shaft (37) inserted into the cleaning assembly (2), left and right transducer brackets (5, 7), at least two transducer permanent magnets (36, 35) respectively arranged on left and right sides of a longitudinal axis (Li) of the drive shaft, at least one permanent magnet bracket for each permanent magnet, left and right side transducer transmission arms fixedly connected to the permanent magnet brackets and the drive shaft (37), at least two transducer elastic members (38) respectively arranged on the left and right sides of the longitudinal axis (Li) of the drive shaft, and at least one fixing member (39) arranged on one of the transducer elastic members is fastened to the left and right transducer brackets (5, 7); one end of the transducer elastic members (38) fixedly connected to the corresponding transducer transmission arms respectively; the left and right side permanent magnets (36, 35) being independent from each other; polarity of a magnetic pole of one side permanent magnet in a direction toward the drive coil being opposite to the polarity of the magnetic pole of the other side permanent magnet in the direction toward the drive coil; the left and right side permanent magnets (36, 35) being movable relative to the fixing member (39) of the transducer elastic members, wherein a upper drive shaft bearing (33) and a lower drive shaft bearing (34) are respectively fixed on the drive shaft (37); the upper drive shaft bearing (33) is fixed in the transducer brackets (5, 7) by a fixed surface (75) of the upper drive shaft bearing located on the left and right transducer brackets (5, 7) and cannot move relative to the fixed surface (75) of the upper drive shaft bearing; the lower drive shaft bearing (34), a upper fixed surface (73) of the lower drive shaft bearing and a lower fixed surface (76) of the lower drive shaft bearing are associated with each other; the lower drive shaft bearing (34) is fixed in the left and right transducer brackets (5, 7) by the upper fixed surface (73) of the lower drive shaft bearing on the left and right transducer brackets (5, 7), such that the lower drive shaft bearing (34) can perform relative movement relative to the upper fixed surface (73) of the lower drive shaft bearing or the lower fixed surface (76) of the lower drive shaft bearing to realize separation or contact between the lower drive shaft bearing (34) and the upper fixed surface (73) of the lower drive shaft bearing on the left and right transducer brackets (5, 7);

the cleaning care appliance further includes a photosensitive pressure alarm device, comprising a lever (32) installed on the left and right transducer brackets (5, 7), a light-emitting element (112) disposed on the circuit board (11) and adjacent to the lever (32), and a photosensitive element (111) disposed on the circuit board (11) and adjacent to the lever (32); the lever (32) being provided with a lever shielding surface (325) or a light-shielding protrusion (327) in the direction toward the circuit board (11); change in a gap between the lever shielding surface (325) or the light-shielding protrusion (327) and the photosensitive element (111) causes light energy emitted by the light-emitting element (112) and reaching the photosensitive element (111) through the gap to be changed; change in corresponding electrical performance parameters of the photosensitive element (111) is detected, so as to acquire a load pressure (Fi) applied on the cleaning element (21).

2. The acoustic wave electric cleaning care appliance according to claim 1, wherein the upper fixed surface (73) of the lower drive shaft bearing and the lower fixed surface (76) of the lower drive shaft bearing restrain the lower drive shaft bearing (34) to only perform limited rotation around a transverse rotation axis ($L_4$) of the drive shaft, that is, the lower drive shaft bearing (34) cannot contact the upper fixed surface (73) of the lower drive shaft bearing and the lower fixed surface (76) of the lower drive shaft bearing at the same time.

3. The acoustic wave electric cleaning care appliance according to claim 2, wherein when the lower drive shaft bearing (34) contacts the upper fixed surface (73) of the lower drive shaft bearing, the lower drive shaft bearing (34) and the drive shaft (37) rotate counterclockwise around the transverse rotation axis ($L_4$) of the drive shaft to reach a maximum angle, the maximum angle is a limited rotation angle of the drive shaft.

4. The acoustic wave electric cleaning care appliance according to claim 3, wherein the limited rotation angle of the drive shaft is 0-2 degrees.

5. The acoustic wave electric cleaning care appliance according to claim 4, wherein the limited rotation angle of the drive shaft is 0-1.5 degrees.

6. The acoustic wave electric cleaning care appliance according to claim 5, wherein the limited rotation angle of the drive shaft is 1 degree.

7. The acoustic wave electric cleaning care appliance according to claim 1, wherein left and right sides of the lever (32) are respectively provided with left and right lever rotation shafts (321, 322); the lever (32) is provided with a protrusion (323) of a short lever arm along a direction away from a lever rotation axis ($L_3$), and in an orientation toward the lower drive shaft bearing (34); the lower drive shaft bearing (34) supports the protrusion (323) of the short lever arm; a protrusion (324) of a long lever arm is provided along a direction away from the lever rotation axis ($L_3$) and move towards the handle rear housing (9), and in an orientation toward the lower drive shaft bearing (34); a spring (31) surrounds an outside of the protrusion (324) of the long lever arm; a bottom plane (326) of the protrusion of the long lever arm supports one end of the spring (31); a bottom plane (77) of spring bearing holes disposed on the left and right transducer brackets (5, 7) supports the other end of the spring (31).

8. The acoustic wave electric cleaning care appliance according to claim 7, wherein the left and right lever rotation shafts (321, 322) have a same lever rotation axis ($L_3$).

9. A pressure alarm device for an acoustic wave electric cleaning care appliance, the acoustic wave type electric cleaning care appliance comprising a handle with a handle housing (13) and a handle rear housing (9); a power supply (10), a circuit board (11), a transducer (3), a drive coil assembly (4), and a cleaning assembly (2) including a cleaning element carrier and a cleaning element (21) are installed in the handle housing (13); the transducer (3) including a drive shaft (37) inserted into the cleaning assembly (2), and left and right transducer brackets (5, 7); a upper drive shaft bearing (33) and a lower drive shaft bearing (34) are respectively fixed on the drive shaft (37), wherein the pressure alarm device includes a lever (32) installed on the left and right transducer brackets (5, 7), a light-emitting element (112) disposed on the circuit board (11) and adjacent to the lever (32), and a photosensitive element (111) disposed on the circuit board (11) and adjacent to the lever (32); the lever (32) is provided with a lever shielding surface (325) or a light-shielding protrusion (327) in a direction toward the circuit board (11); left and right sides of the lever (32) are respectively provided with left and right lever rotation shafts (321, 322); the lever (32) is provided with a protrusion (323) of a short lever arm along a direction away from a lever rotation axis ($L_3$), and in an orientation toward the lower drive shaft bearing (34); the lower drive shaft bearing (34) supports the protrusion (323) of the short lever arm; a protrusion (324) of a long lever arm is provided along a direction away from the lever rotation axis ($L_3$) and move towards the handle rear housing (9), and in an orientation toward the lower drive shaft bearing (34); a spring (31) is provided around an outside of the protrusion (324) of the long lever arm; a bottom plane (326) of the protrusion of the long lever arm supports one end of the spring (31); a bottom plane (77) of spring bearing holes disposed on the left and right transducer brackets (5, 7) supports the other end of the spring (31); change in a gap between the lever shielding surface (325) or the light-shielding protrusion (327) and the photosensitive element (111) causes light energy emitted by the light-emitting element (112) and reaching the photosensitive element (111) through the gap to be changed; change in corresponding electrical performance parameters of the photosensitive element (111) is detected, so as to acquire a load pressure ($F_1$) applied on the cleaning element (21) to realize a pressure alarm.

10. The pressure alarm device according to claim 9, wherein a length of the long lever arm of the lever (32) is $X_2$, and a length of the short lever arm is $X_1$, the ratio of $X_2$ to $X_1$ is in the range of 1.5-5.

11. The pressure alarm device according to claim 10, wherein the ratio of the $X_2$ to the $X_1$ is in the range of 2-4.

* * * * *